United States Patent
Ko et al.

(10) Patent No.: US 7,292,539 B2
(45) Date of Patent: Nov. 6, 2007

(54) ROUTING TABLE MANAGEMENT METHOD USING INTERFACE ID IN THE IPV6

(75) Inventors: Eun-Sook Ko, Suwon (KR); Byung-Gu Choe, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 916 days.

(21) Appl. No.: 10/702,660

(22) Filed: Nov. 7, 2003

(65) Prior Publication Data

US 2004/0120266 A1 Jun. 24, 2004

(30) Foreign Application Priority Data

Nov. 22, 2002 (KR) .................. 10-2002-0073232

(51) Int. Cl.
*H04L 12/26* (2006.01)
(52) U.S. Cl. ........................... 370/252; 370/389
(58) Field of Classification Search ............... 370/234, 370/242, 252, 351, 389, 392, 400–404
See application file for complete search history.

(56) References Cited

U.S. PATENT DOCUMENTS

| | | | |
|---|---|---|---|
| 6,272,127 B1 | 8/2001 | Golden et al. | |
| 6,606,660 B1 | 8/2003 | Bowman-Amuah | |
| 6,744,774 B2 * | 6/2004 | Sharma | 370/401 |
| 7,031,288 B2 * | 4/2006 | Ogier | 370/338 |
| 7,035,225 B2 * | 4/2006 | Hamada | 370/252 |
| 7,095,738 B1 * | 8/2006 | Desanti | 370/389 |
| 2001/0012295 A1 | 8/2001 | Wilford | |
| 2002/0075872 A1 | 6/2002 | Ogawa et al. | |
| 2002/0118682 A1 | 8/2002 | Choe | |
| 2002/0126642 A1 * | 9/2002 | Shitama | 370/338 |
| 2003/0028634 A1 | 2/2003 | Oshizawa | |
| 2003/0161309 A1 * | 8/2003 | Karuppiah | 370/392 |

FOREIGN PATENT DOCUMENTS

JP 2002-252640 9/2002

OTHER PUBLICATIONS

Japanese Office Action of the Japanese Patent Application No. 2003-394624, issued on Feb. 14, 2006.

(Continued)

*Primary Examiner*—Wing Chan
*Assistant Examiner*—Hong Sol Cho
(74) *Attorney, Agent, or Firm*—Robert E. Bushnell, Esq.

(57) ABSTRACT

A routing table management method using an interface ID in the IPv6 that supports RIPng (Routing Information Protocol for next generation), prevents congestion in routing table management because multiple addresses are designated to a single interface, through managing a routing table using a different interface ID for each IPv6 router interface. According to the routing table management method, a first router designates a predetermined value to a first field of a route entry, designates an interface ID to a second field, thereby generating routing information, and a routing information packet including the routing information is transmitted to a second router. Then, the second router extracts a first field value of the received routing information packet from the first router and if the extracted field value is a predetermined value, a second field value is extracted therefrom. Lastly, routing information of a route entry having an interface ID identical with the extracted second field value is updated to routing information of the received routing information packet.

20 Claims, 5 Drawing Sheets

OTHER PUBLICATIONS

An article "RIPng for IPv6"written by Malkin et al., published in REF 2080, pp. 1-6 on Jan. 1997.

European Search Report corresponding to European Patent Application No. 02036803.1, issued on Aug. 31, 2005.

"*Transmission of IPV6 Packets Over Ethernet Networks*," to Crawford. IETF Standard, Internet Engineering T ask Force: Network Working Group, Standards Track, Dec. 1998.

"*IP Version 6 Addressing Architecture*," to Hinden, et al. The Internet Society: Network Working Group, Jul. 1998.

"*Automatic Prefix Delegation Protocol for Internet Protocol Version 6*," to Haberman, et al. IETF Standard-Working Draft, Internet Engineering Task Force: Network Working Group, Feb. 2002.

"*The Next Generation of the Internet: Aspects of the Internet Protocol Version 6*," to Lee, et al. IEEE Network, IEEE Inc. Jan. 1998.

"*Default Address Selection For IPv6*," to Draves. IETF Standard-Working Draft, Internet Enginerring Task Force: Aug. 2002.

"*IPV6 Stateless Address Autoconfiguration*," to Thomson, et al. Network Working Group, Aug. 1996.

\* cited by examiner

FIG. 1

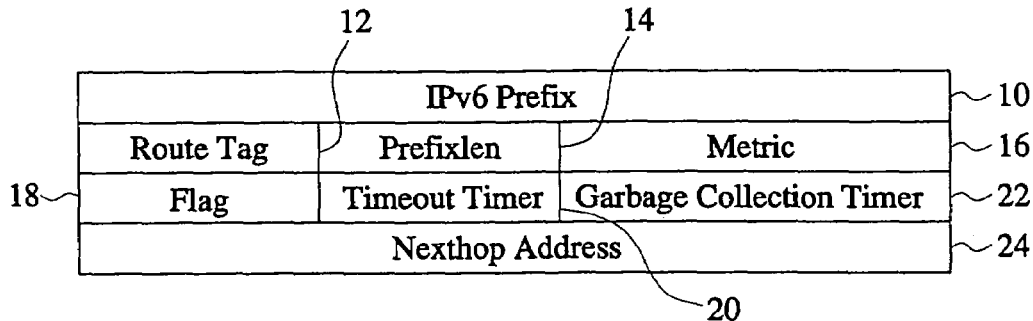

FIG. 2

```
[eunsugi@ipv6-3 eunsugi]# ifconfig
eth0   Link encap:Ethernet  HWaddr 00:04:76:6F:7C:1F
       inet addr:10.100.1.100  Bcast:10.100.1.255  Mask:255.255.255.0
       inet6 addr: fe80::1234:1234:1234:1234/10 Scope:Link
       inet6 addr: fe80::204:76ff:fe6f:7c1f/10 Scope:Link
       UP BROADCAST RUNNING MULTICAST  MTU:1500  Metric:1
       RX packets:75818901 errors:120 dropped:0 overruns:16 frame:192
       TX packets:78205816 errors:0 dropped:0 overruns:0 carrier:3
       collisions:631725 txqueuelen:100
       Interrupt:19 Base address:0xec80 eth1   Link encap:Ethernet  HWaddr 00:04:76:72:3C:56
       inet addr:165.213.143.178  Bcast:165.213.143.255  Mask:255.255.255.0
       inet6 addr: 2002:1234:1234:1234::1/64 Scope:Global
       inet6 addr: fe80::204:76ff:fe72:3c56/10 Scope:Link
       inet6 addr: 3ffe:2e01:2:1::1/64 Scope:Global
       UP BROADCAST RUNNING MULTICAST  MTU:1500  Metric:1
       RX packets:384665140 errors:9212 dropped:0 overruns:508492 frame:13784
       TX packets:6283119 errors:0 dropped:0 overruns:0 carrier:451
       collisions:15198 txqueuelen:100
       Interrupt:18 Base address:0xe080
```

ROUTING TABLE MANAGEMENT METHOD USING INTERFACE ID IN THE IPV6

CLAIM OF PRIORITY

This application makes reference to, incorporates the same herein, and claims all benefits accruing under 35 U.S.C. §119 from an application for ROUTING TABLE MANAGEMENT METHOD USING INTERFACE ID IN THE IPv6 earlier filed in the Korean Intellectual Property Office on 22 Nov. 2002 and there duly assigned Serial No. 2002-73232.

BACKGROUND OF THE INVENTION

1. Field of the Invention

The present invention relates to a routing table management method using an interface ID (identification) in the IPv6 (Internet Protocol version 6), and more particularly, to a routing table management method using an interface ID in the IPv6 that supports a RIPng (Routing Information Protocol for next generation), to prevent congestion in routing table management because of a multisource address, through managing a routing table using a different interface ID for each IPv6 router interface.

2. Description of the Related Art

Internet standard protocol, TCP/IP (Transport Control Protocol/Internet Protocol) of a computer, like other network protocols, has layered structure called protocol stack, protocol suite or simply protocol structure.

The TCP/IP protocol stack has two very important infrastructures, namely TCP and IP. The IP protocol corresponds to an OSI (Open Systems Interface) layer 3, and IPv4 is one of the most popular versions now. It is usually used to connect physical subnetworks and select a route to a destination IP address.

To this end, the IP protocol provides source addresses and destination addresses of a number of internetworked terminals and nodes and does interpretation. The Internetwork layer being currently used employs a 32-bit IP address for intercommunication between hosts over a network. IP address distinguishes a specific node by using a network IP and a node IP (host IP).

As there has been an explosive increase in Internet use since 1990's, it became necessary to improve some weaknesses in the IPv4, including a shortage of allocable resources, lack of mobility, lack of security and so forth. To overcome these shortcomings, a new standard protocol, IPv6, was developed.

The IPv6, also called IPng (Internet Protocol next generation), is well described in RFC (Request for comments) 2460 standard document. Extending the length of an IP address from an existing 32 bits to 128 bits, the IPv6 protocol resolved the problem with the deficiency of Internet address resources, and provided a way to process multimedia data in real time. Unlike the IPv4 protocol in which a patch type protocol IPsec (Internet Protocol Security Protocol) was installed separately, the IPv6 protocol mounted the IPsec onto the protocol directly, thereby fortifying a security function even more.

However, IPv6 protocols and IPv4 protocols are not compatible to each other because their header structures are different. Supposedly in the near future IPv4 network will be replaced to one that can support IPv6 network or both the IPv4 and the IPv6 at the same time. In addition, the IPv6 protocol has been gradually expanding its application range through diverse test networks and part of commercial networks.

An IPv6 application TCP/IP standard protocol is composed of an application layer, a transport layer implemented of TCP or UDP (User Datagram Protocol), Internetwork layer implemented of IPv6 and/or ICMPv6 (Internet Control Message Protocol for IPv6), and a physical layer.

IPv6 Datagram, similar to the IPv4, is composed of two parts: Header and Payload. The payload transmits data between two hosts. IPv6 header has a fixed length of 40 bytes, and does not have a header checksum field that is known as a serious bottleneck phenomenon in the IPv4 protocol. More specifically, the header structure of the IPv6 protocol, unlike in the IPv4 protocol, is capable of supporting mobility and security, and providing quality assurance of the multimedia applications.

As for basic header fields of the IPv6 standard protocol, a 4-bit version field, an 8-bit traffic class field, a 20-bit stream label field in connection with QoS (Quality of Service), a 16-bit unsigned integer payload length field, an 8-bit NH (Next Header) defining type of a next header in the IPv6 header, an 8-bit unsigned integer hop field that decreases by '1' each time from respective nodes forwarding a packet, a source address field representing a 128-bit address of a packet sender, and a destination address field representing a 128-bit address of a packet receiver.

Expanded header fields for implementing IPv6 more perfectly include a hop-by-hop option field, a destination option header, a routing header, a fragment header, an authentication header, an ESP (Encapsulating Security Payload) header and so on.

This type of IPv6 protocol is usually implemented in the form of software for PCs (personal computers). In general, it is adaptive to operating systems like WINDOWS, LINUX, REAL-TIME, or OS.

On the other hand, routing protocols can be divided into two kinds, namely IGP (Interior Gateway Protocol) and EGP (Exterior Gateway Protocol).

The IGP is a routing protocol used in one domain. Typical IGP protocols being currently used in the IPv4 include RIP (Routing Information Protocol), OSPF (Open Shortest Path First), IS-IS (Intermediate System to Intermediate System) and so forth.

The EGP is usually used for exchanging routing information between different domains, especially between ASs (autonomous systems). One of the typical EGP protocol for use in the IPv4 is BGP (Border Gateway Protocol).

The IGP transmits routing information within an AS while the EGP transmits routing information among more than one ASs.

In fact in a theoretical sense, the IPv6 routing technology is not much different from an existing IPv4 except that the IPv6, compared to the IPv4, sets forth more strict regulations on IPv6 addressing, e.g. route aggregation, and for this, an appropriate routing protocol should be designated and operated.

The following describes routing protocols supporting an already standardized IPv6 or an IPv6 in progress of standardization:

IGP protocols for use in IPv6
RIPng
OSPFv6
IPv6 or IS-IS
EGP protocol for use in IPv6
BGP4+

RIP is the most frequently used IPv6 protocol implemented with a distance vector base algorithm.

Its definition was first given in 1988, and standardized by RFC 1058.

As aforementioned, the RIP is a protocol based on a distance vector algorithm. The protocol itself is very simple and was originally designed for small and medium sized networks. However, it has several defects as follows:

First, the longest route of the RIP is limited to a 15-hop network;

Second, the RIP undergoes a process called "counting unto infinity" for the purpose of solving a routing loop problem. Unfortunately this process consumes a great amount of network resources even before solving the problem; and Third, the RIP does not consider real time parameters, e.g. delay, reliability or load, but uses a fixed measurement standard to compare alternate routes.

Following RFC 1723 (RIPv2), RFC 2080 (IPv6 supporting RIPng standard) defines the RIP protocol.

Although many algorithms for selecting an optimum source address are being studied to prevent the RIPng router from taking improper actions, the algorithms are all about selecting one of multiple addresses and designating it as a source address. Thus, if the source address is changed when selecting one according to the algorithm, the RIPng router is ended up with congestion again.

SUMMARY OF THE INVENTION

It is, therefore, an object of the present invention to provide a routing table management method using an interface ID in the IPv6, capable of preventing a congestion phenomenon that occurs when managing a routing table with multiple source addresses designated for the IPv6 router interface supporting RIPng (Routing Information Protocol for next generation).

It is another object to provide an apparatus and technique for preventing routing problems caused by designating multiple link-local IPv6 addresses to one interface.

It is yet another object to provide an apparatus and technique that prevents the routing problem at an application level in a default address selection mechanism.

It is still yet another object to provide an apparatus and technique according to the present invention that as long as a physical interface's own ID is used, the RIPng can be applied independent of source addresses even when routing congestion is controlled at a lower level than an application level.

To achieve the above and other objects, there is provided a routing table management method applicable to a network having a plurality of routers and a plurality of hosts, the method including: a first step, in which a first router designates a predetermined value to a first field of a route entry, designates an interface ID to a second field, thereby generating routing information, and a routing information packet including the routing information is transmitted to a second router; a second step, in which the second router extracts a first field value of the received routing information packet from the first router and if the extracted field value is a predetermined value, a second field value is extracted therefrom; and a third step for updating routing information of a route entry having an interface ID identical with the extracted second field value to routing information of the received routing information packet. Here, the interface ID designated to the second field can be generated using a MAC Address (Media Access Control address).

In addition, the first step includes the sub-steps of: extracting, at the first router, an interface ID from interface information; designating, at the first router, a predetermined value to the first field of the route entry; designating, at the first router, the extracted interface ID to the second field of the route entry; generating a routing information packet including the first field with the predetermined value, the second field with the designated interface ID, and routing information; and transmitting, at the first router, the generated routing information packet to the second router.

Also, the third step includes the sub-step of: deciding whether the routing table has a route entry having an interface ID identical with the second field, and if the routing table has the route entries having the identical interface IDs, updating routing information of the route entry to routing information of the received routing information packet, but if the routing table does not have route entries with the identical interface IDs, designating the interface value of a source router to a received interface ID and generating a route entry using the routing information of the received routing information packet.

Preferably, an IGP (Interior Gateway Protocol) or RIPng (Routing Information Protocol for next generation) is used for a routing protocol between the first router and the second router.

The first field is a metric designation field, and the second field is a prefix field. Moreover, the metric designation field takes one value out of a range 17-255.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a diagram illustrating a RIPng routing table of a related art;

FIG. 2 is a diagram illustrating multiple source addresses designated in an IPv6 router interface of a related art;

DETAILED DESCRIPTION OF THE PREFERRED EMBODIMENTS

Figure 3:
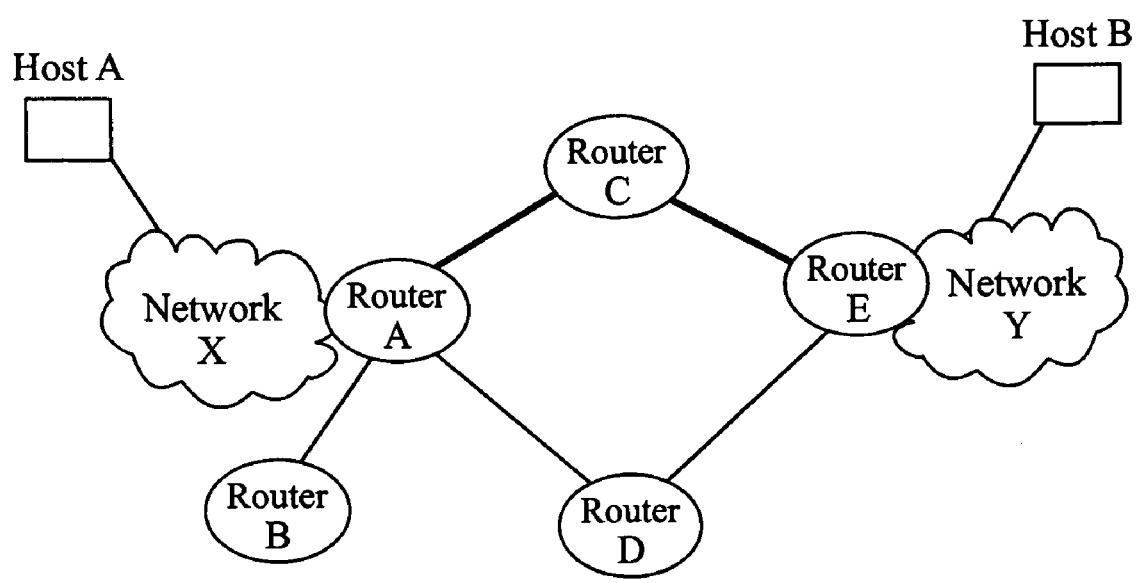
FIG. 3 is a diagram showing a connection state of a plurality of routers to which the present invention is applied.

Turning now to the drawings, to see an IPv6 routing table entry under management of the RIPng with reference to FIG. 1, the entry should include information on an IPv6 prefix 10 of a destination, a metric 16 for displaying a total cost needed to transmit Datagram to the destination, an IPv6 address 24 of a next router representing a nexthop, a route change flag 18 for informing whether a router has recently been changed, and a 30-sec (second) timer 20 and 22 for transmitting routing table information to a neighbor router.

The RIPng is a UDP base protocol, and transmits/receives a packet on a UDP port number 521. A RIPng packet includes three fields, i.e. a command (request or reply), version and routing table entry.

Also, each route table entry includes an IPv6 prefix 10, a route tag 12 for separating an interior router from an exterior router, a prefix length field 14 for deciding important bits in the prefix, and a meter 16 for defining a present destination meter.

Further, the RIPng shows a nexthop IPv6 address for a packet. The nexthop is designated through a RTE (Route Table Entry) packet and a nexthop RTE.

A nexthop RTE packet is distinguished by a FFH value in a metric field. The length of route tag and prefix are set to zero when transmitting a packet and disregarded when receiving a packet.

The nexthop of the RIPng may or may not be expressed in the nexthop field of a received RIPng packet.

In general, the nexthop is set to 0:0:0:0:0:0:0:0, and when the nexthop of the received RIPng packet is 0:0:0:0:0:0:0:0, the address of a packet-transmitted router is designated as the address of the nexthop.

If the nexthop address is known, it has to be a link-local address all the time.

This is because when an IPv4 base RIP is designed, the RIPng is designed to the IGP so its data is valid only over a directly-connected network and used in the link-local scope.

In other words, the IPv6 source address of Datagram in the RIPng has to be a link-local address always.

RIPng version 1 supports two commands, request and reply. The request command is used when requesting part or the entire routing table. In most cases, the request is transmitted as a multicaster from the RIPng (port 521).

There are three types of reply command, including a reply to a specific inquiry, a regular update being transmitted to every neighbor router every 30 seconds, and an update for causing changes in a router.

Definitions of request and reply packet processing are defined in RFC 2080 and RFC 2081, respectively.

According to RFC 2080, when generating a reply message in the RIPng, the IPv6 source address should be a transmitting router interfaceable link-local address all the time except when the reply message is an answer for a unit cast request message of another port other than the RIPng port.

In case the reply is for the unit cast request message, the source address should be a globally valid address.

Moreover, the router interfaceable link-local address was used for the IPv6 source address because on receiving the reply message, the receiving router uses the source address for the nexthop.

If the receiving router uses a wrong source address, the other router cannot route the datagram.

Sometimes, the router uses a plurality of IPv6 addresses as an address for one physical interface.

This means that a number of logical IPv6 networks can be implemented by a single physical medium.

It is also possible that a router uses a plurality of link-local addresses for one physical interface.

FIG. 2 illustrates a multiple source address designated in a general IPv6 router interface. As shown in the drawing, a multiple global IPv6 addresses or multiple link-local IPv6 addresses can be designated for an IPv6 router interface.

Referring to FIG. 2, the multiple link-local IPv6 addresses are designated in an IPv6 router interface eth0, and the multiple global IPv6 addresses are designated in an IPv6 router interface eth1.

In like manner, multiple source addresses are designated in an IPv6 router interface to find a most efficient route to a destination by using an optimal address among many source addresses and destination addresses.

In fact, methods for selecting optimal source address and destination address are being actively developed.

On the other hand, when a router uses a plurality of link-local addresses for one physical interface, the router must generate a reply message using one of link-local addresses defined for interface as a source address.

Also, when a local address being currently used is not valid, the invalid local address should be replaced to another local address.

This exchange is necessary for a receiving a node that received the reply message to distinguish a transmitting side based on the source address.

If the router receives a multipacket using another source address from the same router, the router decides that the multipacket is sent from a different router and takes an improper action.

That is, if a plurality of packets from the same router use different source addresses for link-local addresses, respectively, the RIPng router when receiving the packets decides that those packets are from different routers.

Moreover, when a router transmits a packet with a network prefix after designating a new link-local address as a source address because the link-local address having been used is no longer valid, a receiving router decides that the packet is from another router.

For instance, suppose that a R1 router uses a link-local address fe80::1:2:3:4/10 designated in an I1 interface as a source address and transmits routing information regarding 10.0.0.0/8 with metric 3 to a R2 router. Then, the R1 router selects a fe80::5:6:7:7/10 as a new source address during a next update cycle because the address fe80::1:2:3:4/10 is no longer valid, and transmits an update packet-regarding 10.0.0.0/8 to the R2 router, having changed the metric to 5.

At this time, the R2 router decides that the previously transmitted routing information and the routing information transmitted later are sent from different source routers, and performs a decision processing therefor.

As a result, the routing information received for the second time, of which metric is 5 and prefix is 10.0.0.0/8, is disregarded. In short, the IPv6 router, as it uses multiple link-local addresses, can cause congestion in source address selection, and the receiving router can include wrong routing information in its routing table.

Although many algorithms for selecting an optimum source address are being studied to prevent the RIPng router from taking improper actions, the algorithms are all about selecting one of multiple addresses and designating it as a source address. Thus, if the source address is changed when selecting one according to the algorithm, the RIPng router is ended up with congestion again.

The following detailed description will present a routing table management method using an interface ID in the IPv6 according to a preferred embodiment of the invention in reference to the accompanying drawings.

FIG. 3 shows how a plurality of routers are connected to each other, including a plurality of IPv6 routers RA (Router A)~RE (Router E) mounted with an interface having multiple link-local IPv6 addresses and a modified RIPng, and a plurality of IPv6 hosts HA (Host A) and HB (Host B) that are connected to the plural routers RA~RE. The routers RA~RE and the hosts HA and HB should be set up over the same network.

When the source routers RA~RE mounted with the modified RIPng transmit a packet including routing information to neighbor routers RA~RE, they transmit interface IDs in replacement of source addresses.

Each interface has its own ID. Even though multiple link-local IPv6 addresses could be designated in one interface, there is only one interface ID because it is generated by using MAC Address. The present invention illustrated Ethernet using MAC Address to generate an interface ID out of convenience, but other links can also generate interface IDs, following the relevant standards therefor. For example, in case of ATM (Asynchronous Transfer Mode), the standard is shown in RFC2492. In like manner, RFC2470 defines a standard for token ring network, RFC2590 for FrameRelay, RFC2467 for FDDI (Fiber Distributed Data Interface0, and RFC2491 for NBMA (Non Broadcast Multi Access).

Turning back to FIGS. 1 and 2, there were two link-local addresses of the interface eth0. Particularly, 'fe80' out of 'fe80::204:76ff:fe6f:7c1;f/10' is a prefix address and the rest '204:76ff:fe6f:7c1f/' is an interface ID.

Figure 4A:
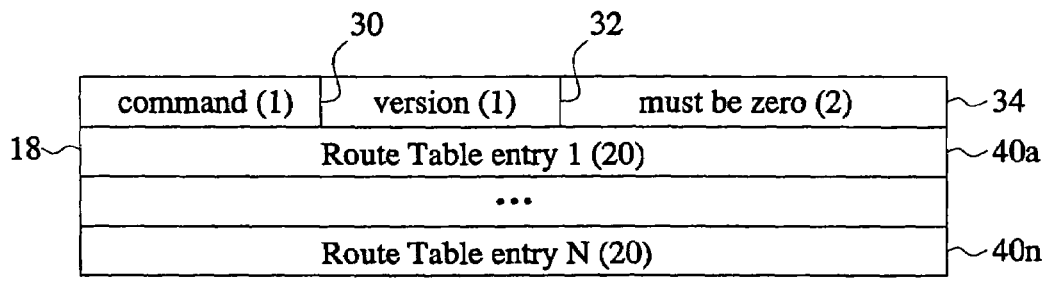
FIG. 4a depicts a general RIPng packet format.
Figure 4B:
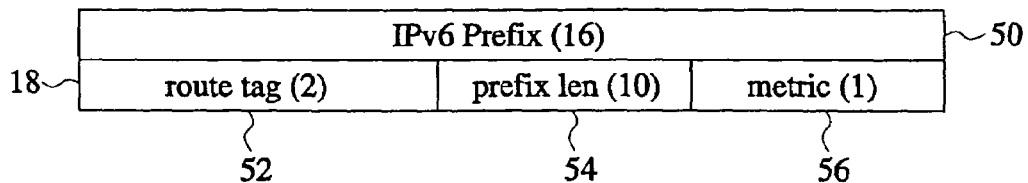
FIG. 4b depicts a router table entry format.

FIG. 4a shows a general RIPng packet format, and FIG. 4b shows a router table entry format.

As shown in FIG. 4a, the general RIPng packet format is composed of a command 30, a version 32, and a plurality of route table entries 40a~40n. The route table entries 40a 40n include an IPv6 prefix 50, a route tag 52, and a metric 56. Each route table entry also includes a prefix length field 54.

Since only one interface ID is needed as the replacement of a source address, if a metric value of the RIPng packet is 0×FF, the interface ID is designated in the prefix 50. The metric value for 0×FF can be 1 byte. In the present invention, the metric value ranges are 17~255 because 0~16 are already being used. Particularly, the value 255 out of the available range is chosen.

Figure 5:
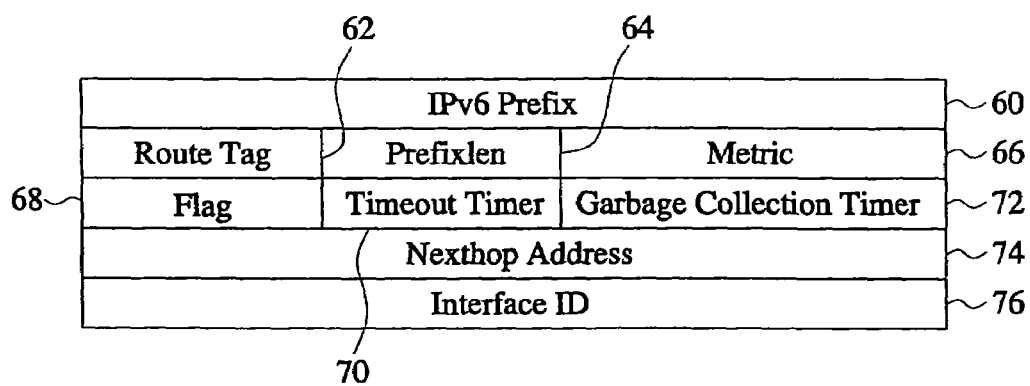
FIG. 5 is a diagram illustrating a modified RIPng routing table according to the present invention.

On the other hand, the routing table for routers RA~RE mounted with a modified RIPng should have an interface ID field to store interface IDs for the source routers RA~RE. FIG. 5 illustrates the structure of a routing table for the modified RIPng having a separate interface ID field.

As shown in FIG. 5; the routing table for the modified RIPng is composed of an IPv6 prefix 60 of a designation, a metric 66 for representing a distance to the designation, a flag 68, timers 70 and 72, a next router's IPv6 address 74 representing a nexthop, and additionally an interface ID field 76 for storing interface IDs. Each route table entry also includes a route tag 62 and a prefix length field 64.

Receiving a packet including routing information, the router RA~RE mounted with the modified RIPng checks the received packet to see whether there is a route table entry with a metric value of 0×FF, and if so, stores a prefix field value in the interface ID field 76 of the packet source router RA~RE because the interface ID must have been stored in the prefix 60.

When processing the route entry, the router RA~RE compares interface IDs to each other, and if they are identical, decides that the route entry is sent from the same source router RA~RE because, as aforementioned, the interface ID is a specific value for each interface.

If the source addresses of a received packet are different from each other, the router RA~RE compares interface IDs, and if the interface IDs are identical, decides that the same source router RA~RE transmitted the entry. The previous nexthop of the routing table is updated to a new source address.

In addition, when searching a routing table, it is recommended to search entries with the same interface ID and then select a corresponding prefix. At this time, the source address does not need to be searched out.

This is because when the interface IDs are identical, the route entry information is transmitted from the same router RA~RE although source addresses might be different from each other.

Figure 6:
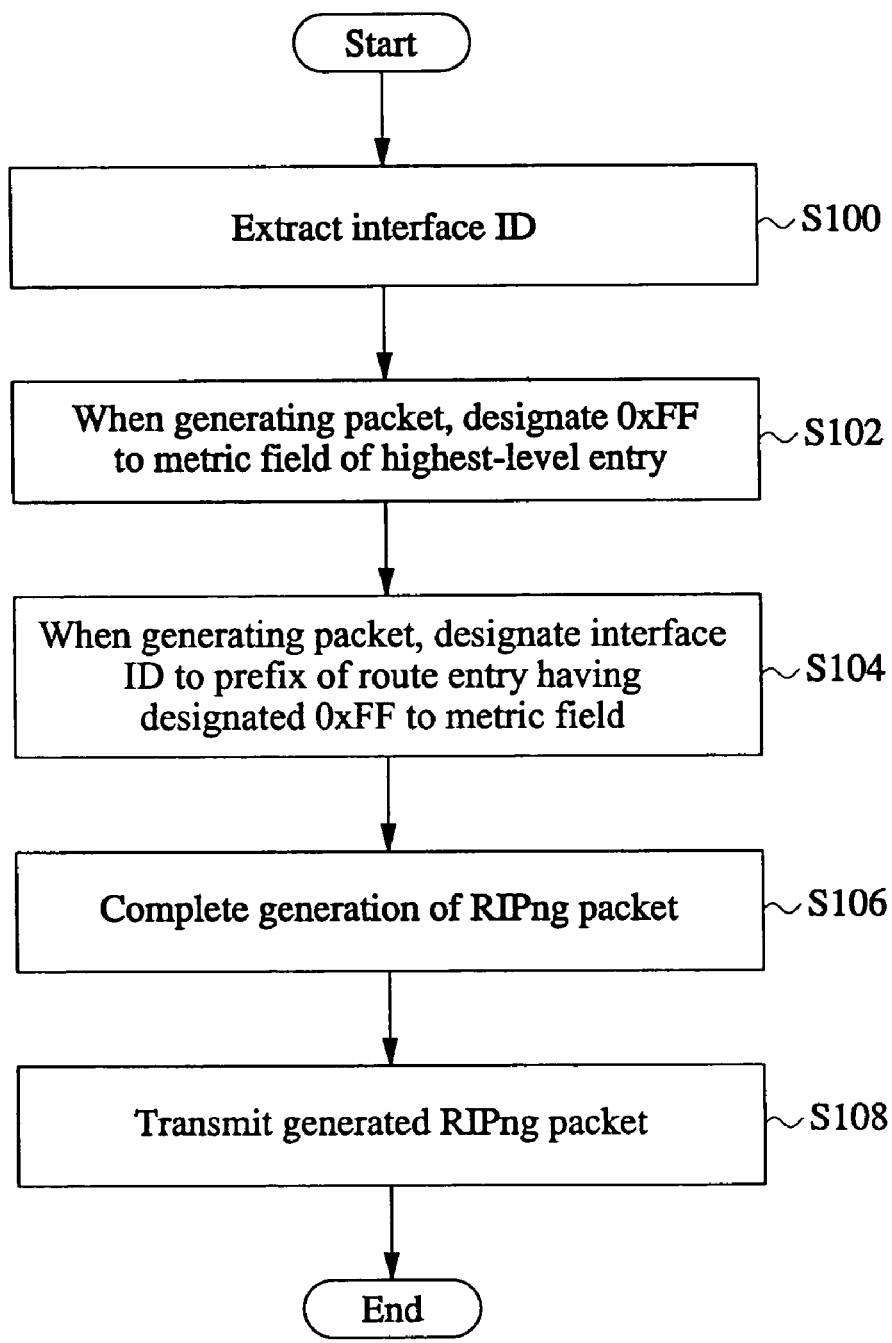
FIG. 6 is a flow chart showing a generation and transmission procedure of a packet with routing information on a transmitting router according to a preferred embodiment of the present invention.

FIG. 6 is a flow chart showing a generation and transmission procedure of a packet with routing information on a transmitting router according to a preferred embodiment of the present invention.

As illustrated in FIG. 6, the transmitting router extracts an interface ID from the interface information (S100), and when generating a packet, designates 0×FF value to the metric field of the highest-level route entry (S102), indicating that an interface ID has been given to the prefix of the route entry.

Next, the transmitting router designates an interface ID to the prefix of the route entry where 0×FF value is being set up in the metric field (S104), and completes packet generation following the known RIPng packet generation method (S106), and transmits the generated RIPng packet to another router (S108).

Figure 7:
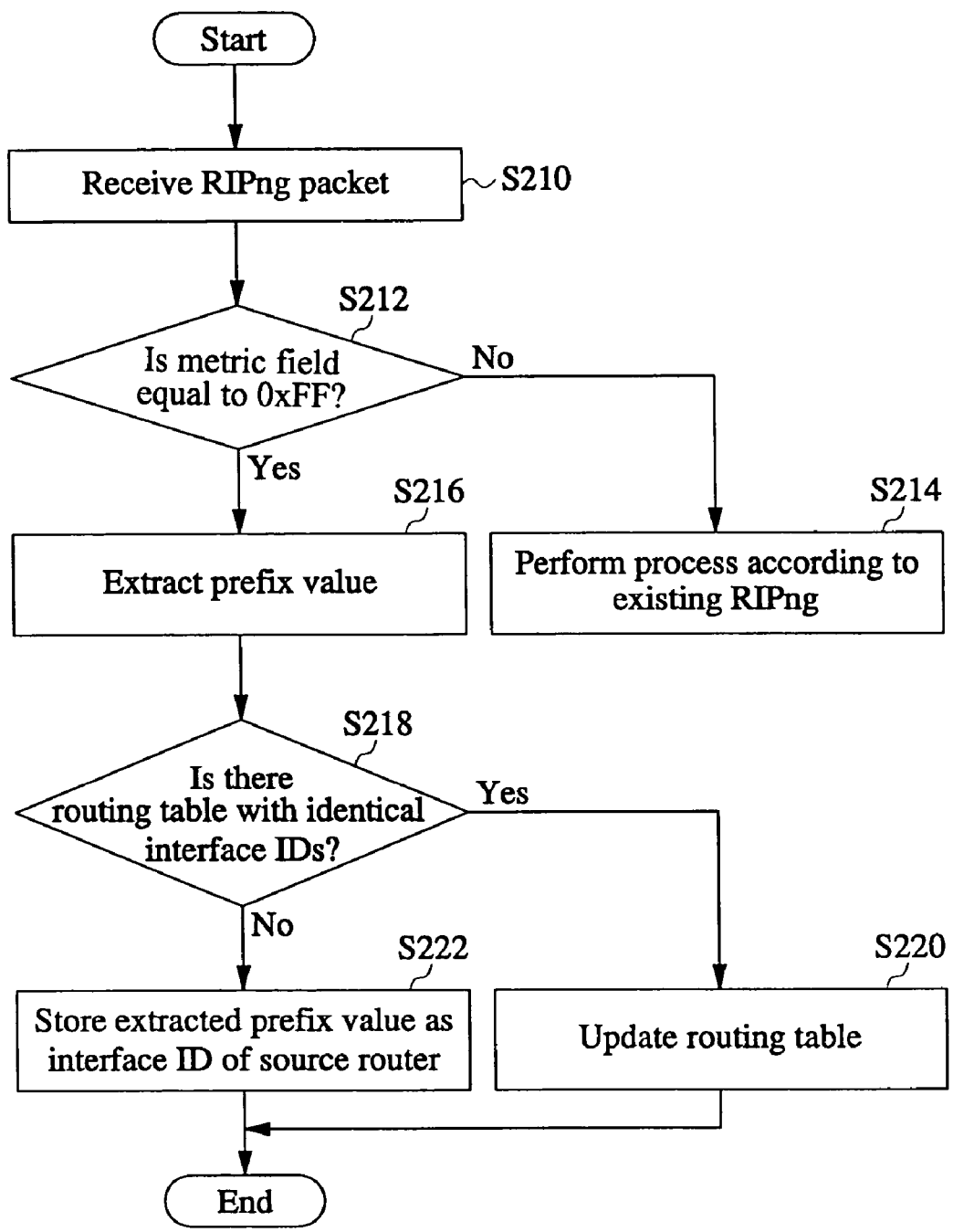
FIG. 7 is a flow chart showing how to process a received packet including routing information of a receiving router according to another preferred embodiment of the present invention.

FIG. 7 is a flow chart showing how to process a received packet including routing information of the receiving router according to another preferred embodiment of the present invention.

As illustrated in FIG. 7, upon receiving the RIPng packet (S210), the receiving router decides whether the metric field value of the route entry is 0×FF (S212).

If it turns out that the metric field value is not 0×FF value, the receiving router performs the process of the existing RIPng (S214), and if the metric field value is 0×FF value, meaning that the interface ID of the source router has been designated to the prefix field, the receiving router extracts a prefix value (S216) and decides whether there exists a routing table having the same interface ID (S218).

If there is a routing table with the identical interface ID, the receiving router updates the routing table (S220). However, if there is no such routing table having the identical interface ID, the receiving router stores the extracted prefix value as the interface ID of the source router (S222).

So far the RIP (Routing Information Protocol) has been described as a routing protocol for IPv6, but it is also applicable to the IGP (Interior Gateway Protocol) for use in small-sized networks, such as, OSPF and IS-IS.

In conclusion, the present invention can be advantageously used for solving a possible routing problem caused by designating multiple link-local IPv6 addresses to one interface.

Moreover, although further discussions should be made continuously whether to solve the routing problem at an application level in a default address selection mechanism, according to the present invention, as long as a physical interface's own ID is used, the RIPng can be applied independent of source addresses even when routing congestion is controlled at a lower level than an application level.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A routing table management method applicable to a network having a plurality of routers and a plurality of hosts, the method comprising:
   designating, by a first router, a predetermined value to a first field of a route entry, and designating, by the first router, an interface identification to a second field, accommodating a generating of routing information, and a routing information packet including the routing information being transmitted to a second router;
   extracting, by the second router, a first field value of the received routing information packet from the first router and when the extracted field value is the predetermined value, a second field value is extracted therefrom; and
   updating routing information of a route entry having an interface identification identical with the extracted second field value to routing information of the received routing information packet.

2. The method according to claim 1, wherein the interface identification designated to the second field is generated using a media access control address.

3. The method according to claim 1, wherein the step of designating by the first router comprises the sub-steps of:
   extracting, at the first router, an interface identification from interface information;
   designating, at the first router, the predetermined value to the first field of the route entry;
   designating, at the first router, the extracted interface identification to the second field of the route entry;
   generating a routing information packet including the first field with the predetermined value, the second field with the designated interface identification, and routing information; and
   transmitting, at the first router, the generated routing information packet to the second router.

4. The method according to claim 1, wherein the step of updating routing information of the route entry comprises the sub-steps of:
   deciding whether the routing table has a route entry having an interface identification identical with the second field, and when the routing table has the route entries having the identical interface identifications, updating routing information of the route entry to routing information of the received routing information packet, but when the routing table does not have route entries with the identical interface identifications, designating the interface value of the second router to a received interface identification and generating a route entry using the routing information of the received routing information packet.

5. The method according to claim 1, wherein an interior gateway protocol is used for a routing protocol between the first router and the second router.

6. The method according to claim 1, wherein a routing information protocol for next generation is used for a routing protocol between the first router and the second router.

7. The method according to claim 1, wherein the first field is a metric designation field, and the second field is a prefix field.

8. The method according to claim 7, wherein at least one of values in a range of 17 to 255 is used as a field value for the metric designation field.

9. The method according to claim 7, wherein 255 is used as a field value for the metric designation field.

10. A network, comprising:
    a first router designating a predetermined value to a first field of a route entry, and designating an interface identification to a second field, accommodating a generating of routing information, and a routing information packet including the routing information being transmitted to a second router; and
    the second router connected to the first router, extracting a first field value of the received routing information packet from the first router and when the extracted field value is the predetermined value, a second field value is extracted therefrom, and updating routing information of a route entry having an interface identification identical with the extracted second field value to routing information of the received routing information packet, and the first and second routers being connected to a plurality of hosts.

11. The network according to claim 10, further comprised of:
    the first router extracting an interface identification from interface information, the first router designating the predetermined value to the first field of the route entry, the first router designating the extracted interface identification to the second field of the route entry, generating a routing information packet including the first field with the predetermined value, the second field with the designated interface identification, and routing information, and the first router transmitting the generated routing information packet to the second router.

12. A method, comprising:
    determining, by a receiving router, whether a first field value of the route entry is a predetermined value upon receiving a packet of a routing protocol;
    performing, by a receiving router, the process of the existing routing protocol when the first field value is not the predetermined value;
    extracting, by the receiving router, a second field value and deciding whether there exists a routing table having the same interface identification when the first field value is the predetermined value, where the interface identification of a source router has been designated to a second field;
    updating routing information of a route entry having an interface identification identical with the second field value extracted to routing information of the received routing information package.

13. The method according to claim 12, wherein the interface identification designated to the second field is generated using a media access control address.

14. The method according to claim 13, further comprised of:
    extracting, at the receiving router, the interface identification from the interface information;
    designating, at the receiving router, the predetermined value to the first field of the route entry;
    designating, at the receiving router, the extracted interface identification to the second field of the route entry;
    generating a routing information packet including the first field with the predetermined value, the second field with the designated interface identification, and routing information; and
    transmitting, at the receiving router, the generated routing information packet to the source router.

15. The method according to claim 14, wherein the updating of the routing table further comprises of:
    deciding whether the routing table has a route entry having an interface identification identical with the second field, and when the routing table has the route entries having the identical interface identifications, updating routing information of the route entry to routing information of the received routing information packet, but when the routing table does not have route entries with the identical interface identifications, designating the interface value of the source router to a received interface identification and generating a route entry using the routing information of the received routing information packet.

16. The method according to claim 15, wherein an interior gateway protocol is used for the routing protocol between the source router and receiving router.

17. The method according to claim 15, wherein a routing information protocol for next generation is used for the routing protocol between the source router and the receiving router.

18. The method according to claim 15, wherein the first field is a metric designation field, and the second field is a prefix field.

19. The method according to claim 18, wherein at least one of values in a range of 17 to 255 is used as the field value for the metric designation field.

20. The method according to claim 18, wherein 255 is used as the field value for the metric designation field.

* * * * *